INVENTORS
LUDWIG KLENK
HANS STRUTZEL
RICHARD SOBOTTKA

BY *Bryan and Butrum*
ATTORNEYS

United States Patent Office 3,679,435
Patented July 25, 1972

3,679,435
SAUSAGE CASINGS OF SYNTHETIC HIGH-POLYMER THERMOPLASTIC MATERIAL
Ludwig Klenk, Hallgarten, Rheingau, Hans Strutzel, Wiesbaden-Dotzheim, and Richard Sobottka, Wiesbaden-Biebrich, Germany, assignors to Kalle Aktiengesellschaft, Wiesbaden-Biebrich, Germany
Filed Sept. 25, 1968, Ser. No. 762,597
Claims priority, application Germany, Sept. 27, 1967, K 63,470
Int. Cl. A22c 13/00; B29c 13/00
U.S. Cl. 99—176
1 Claim

ABSTRACT OF THE DISCLOSURE

A plastic sausage casing material which is convertible into an annular casing and to a process for the manufacture of such a casing in which process a tube of synthetic high-polymer thermoplastic material, which has been longitudinally stretched and thus is shrinkable in its longitudinal direction by heating, is filled with a gas and the gas-filled tube is heated on one longitudinal side only, while preventing longitudinal shrinkage, to a temperature at which the tube loses its shrinkability while maintaining conditions preventing shrinkage.

---

Figure 1:
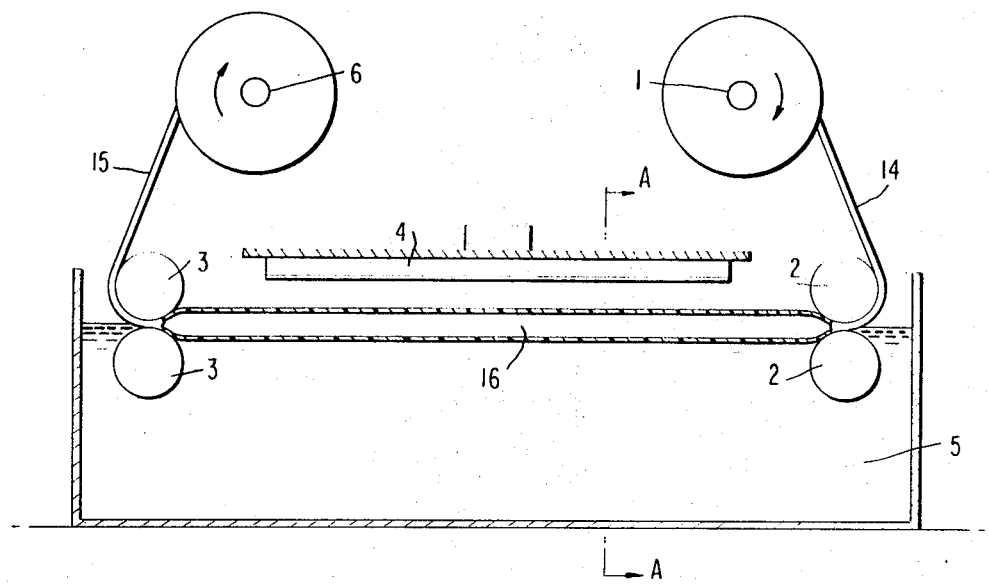

This invention relates to sausage casings prepared from synthetic high-polymer thermoplastic material which are suitable for use in the production of artificial so-called casings for sausage rings, and to a process for the production of such sausage casings.

It is known to produce artificial sausage casings for use in the production of sausage materials, e.g. from regenerated cellulose and from synthetic high-polymer thermoplastics. It also is known to produce artificial sausage casing material from regenerated cellulose in the round curved form which imitates the curved form of natural casings, which are called ring or annular casings, and are often desired for some types of German sausage specialities, e.g. "Leberwurst," "Blutwurst," and "Fleischwurst." Processes are known for the production of artificial annular casings from regenerated cellulose. One of the known processes utilizes the fact that tubes of regenerated cellulose can be fixed by heating in the curved form. In this process, tubes filled with air are spirally wound around a heated drum and the side of the tube adjacent the drum is sufficiently heated so that the spiral form is fixed, at least partially. Another known process employs the deformability of tubes freshly precipitated from a viscose solution and not fully regenerated. In this process, tubes freshly precipitated from viscose, filled with air, and in a spiral form are completely regenerated whereby the spiral form becomes fixed. The first-mentioned process may be performed only discontinuously and yields sausage casings of an only imperfect annular form and from partially undesirably brittle material. The second-mentioned process requires relatively complicated devices for the performance thereof. The annular casing material produced according to both processes, furthermore, can be advantageously filled with the sausage mass only when it previously has been divided into sections of the lengths of individual sausage casings and tied at one end of each section or otherwise sealed. The production of sausage rings, therefore, is time-consuming.

It also is known to produce annular casings from sterilizable plastic tubes which are shrunk on one longitudinal side and thus have an annular form. But no process hitherto has been known for satisfactorily converting a sterilizable plastic tube into an annular form. At any rate, the known annular casing material developed from sterilizable plastic tubing advantageously can be filled with the sausage material only after the formation of tied individual sections.

The present invention provides a straight plastic sausage casing material which can be converted into an annular casing by heating. The sausage casing material comprises a straight tube of synthetic high-polymer thermoplastic material which has been longitudinally stretched, and thus is shrinkable in its longitudinal direction by heating, while it is not shrinkable on one longitudinal side.

The present invention further provides a continuous process for the production of sausage casing material convertible into annular casings, which material easily can be processed into filled sausage rings. The process uses, in known manner, a plastic tube. In accordance with the invention, a tube of synthetic high-polymer thermoplastic material, which has been longitudinally stretched and thus is shrinkable in its longitudinal direction by heat, is filled with a gas and the gas-filled tube is heated on one longitudinal side only, while preventing longitudinal shrinkage, to a temperature at which the tube loses its shrinkability while maintaining conditions preventing shrinkage.

The process employs tubes of synthetic high-polymer thermoplastic material which have been longitudinally stretched in known manner at a temperature below the crystallite melting point of the synthetic plastic material. It is known that films stretched in this manner and prepared from the synthetic plastic material in the crystallite form, possess a shrinkage capacity which tends to return the film to the dimensions thereof present prior to stretching and is capable of acting upon heating to a temperature above the stretching temperature. It is also known that stretched films may lose their shrinkability when they are heated, under conditions preventing shrinkage, up to a temperature which is at least as high as the temperature at which their shrinkability would become effective if they were not prevented from shrinking.

According to the process of the invention, a longitudinally stretched tube of synthetic high-polymer thermoplastic material is heated on one longitudinal side under conditions such that it loses its shrinkability on the heated longitudinal side but retains it on the opposite longitudinal side.

Heating the tube on a longitudinal side is advantageously performed along a relatively narrow strip, the width is about 5 to 10 percent of the periphery of the tube; but the adjacent areas, on both sides of the strip heated with full intensity, are not protected against heat action by radiation, conduction or convection so that the adjacent areas of the heated strip also are exposed to heat which decreases in intensity with increasing distance from the heated strip. Such a method of heating the tube can be achieved in a simple manner by the action of a heat radiator of an appropriately small width.

When the shrinkability maintained on one longitudinal side of the sausage casing material becomes effective by heating, the material curves to produce the annular form. In most cases, this is effectuated only after the filling of the sausage casing material with the sausage mass, since straight sausage casings can be filled in a simpler manner and, furthermore, the sausages usually are cooked or scalded so that the filled sausage casings assume the annular form by themselves. The process advantageously uses stretched synthetic high-polymer thermoplastic tubing the shrinkability of which becomes effective upon heating to a temperature not exceeding 100° C.

The diameter of the sausage rings prepared from the sausage casing material depends upon the degree of shrinkage of the tube used in the process and this shrinkage depends upon the degree of longitudinal stretching to which the tubing has been subjected. It is therefore possible according to the process of the invention to produce a sausage casing material from which sausage rings of the desired ring diameter can be obtained by selecting a tubular material of appropriate longitudinal shrinkability. In order to maintain the shrinkage practically unimpaired on one longitudinal side of the sausage casing material, it may be advantageous during the process of the invention to keep the temperature of the tube on that longitudinal side below the shrinkage temperature by means of a cooling medium.

The sausage casing material obtained according to the invention also can be converted into the annular form by heating it to the shrinkage temperature before filling with the sausage mass. A curled tubular web is then obtained which is delivered to the sausage manufacturer in one piece or divided into individual sausage casing sections and, if desired, tied at one end of each sausage casing section. According to this method, some advantages of the sausage casing material produced according to the invention are lost, but it sometimes may be of advantage, e.g. when the sausage manufacturer has sausage filling machines which can be used only for filling individual sections.

Figure 2:
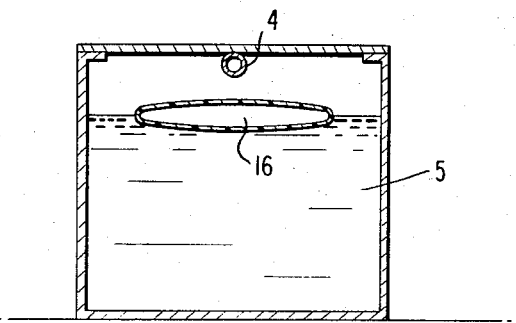

The process will be further illustrated by reference to the accompanying drawings in which:

FIG. 1 is a schematic sectional front elevation of an apparatus for use in the performance of the process of the invention, and FIG. 2 is a section along the line A—A of FIG. 1.

In the embodiment shown in FIG. 1, a tubular plastic film 14 is unwound from a roll 1. It is conveyed through a pair of nip rolls 2, then horizontally passes through a treatment zone to a second pair of nip rolls 3. Between the two pairs of nip rolls 2 and 3, there is a gas 16 in the plastic tube in order to maintain a spatial separation of the upper half of the tube from the lower half thereof. The two pairs of nip rolls simultaneously prevent longitudinal shrinkage of the tube during heating in the treatment zone between them. The use of longitudinally and transversely stretched tubes, with the gas inside, also prevents shrinkage of the heated part of the tube in the transverse direction. Heating is performed in the illustrated embodiment on the top of the tube and is effected with a narrow heat radiator 4. The bottom of the tube is in contact with cooling water for the purpose of maintaining the shrinkage.

After passing through the pair of nip rolls 3, the plastic tube 15 which has now lost its capacity for longitudinal shrinkage along the longitudinal portion adjacent the heat treatment zone is continuously wound onto a roll 6.

According to the process of the invention, sausage casing material convertible into annular casings was produced by means of the apparatus shown in FIGS. 1 and 2 from a longitudinally stretched tubular film of polyterephthalic glycol ester. Details are given by the following data:

| | |
|---|---|
| Diameter of the tube | 45 mm. |
| Thickness of the tube wall | 0.02 mm. |
| Longitudinal shrinkage at 90° C. | 25%. |
| Air pressure in the interior of the tube within the treatment zone | 10 to 20 mm. water column. |
| Distance between the heat radiator and the upper side of the tube | 40 mm. |
| Length of the treatment zone | 400 to 600 mm. |
| Total radiator performance | 1.5 to 2 kw. |
| Radiator performance per cm.$^2$ of the upper side of the tube | 30 w. |
| Temperature of the cooling water | 20° C. |
| Draw-off speed | 2.5 m./min. |
| Longitudinal shrinkage of the upper side of the tube obtained after treatment at 100° C. | 0 to 0.5%. |
| Longitudinal shinkage of the lower side the tube obtained after treatment at 100° C. | 25%. |

After filling with a sausage mass, sausages with uniform ring diameters are formed by scalding sections tied in appropriate lengths.

| | |
|---|---|
| Temperature at scalding | 80 to 95° C. |
| Formed outer ring diameter | 200 mm. |

It will be obvious to those skilled in the art that many modifications may be made within the scope of the present invention without departing from the spirit thereof, and the invention includes all such modifications.

What is claimed is:

1. A plastic sausage casing material convertible into annular casings by application of heat which comprises a straight tube of a synthetic, longitudinally stretched, high-polymer thermoplastic material, said tube having substantially no capacity for longitudinal heat shrinkage in one portion extending the entire length of the casing, the remaining portion of the tube extending the entire length of the casing being longitudinally heat shrinkable.

References Cited

UNITED STATES PATENTS

| | | | |
|---|---|---|---|
| 2,136,566 | 11/1938 | Schnecko. | |
| 2,246,236 | 6/1941 | Becker | 99—176 |
| 2,267,217 | 12/1941 | Reichel | 99—176 X |
| 2,420,310 | 5/1947 | Goodman | 99—176 X |
| 2,762,720 | 9/1956 | Michel | 99—171 X |
| 2,925,621 | 2/1960 | Parth. | |
| 3,172,593 | 3/1965 | Potter | 99—171 X |
| 3,262,451 | 7/1966 | Morse | 264—230 |
| 3,394,429 | 7/1968 | Nakagawa | 264—290 T |

FRANK W. LUTTER, Primary Examiner

R. HALPER, Assistant Examiner

U.S. Cl. X.R.

264—230, 290, 346